United States Patent [19]

Mangus

[11] 4,233,116
[45] Nov. 11, 1980

[54] NUCLEAR REACTOR COOLANT TRANSPORT SYSTEM

[75] Inventor: James D. Mangus, Greensburg, Pa.

[73] Assignee: Westinghouse Electric Corp., Pittsburgh, Pa.

[21] Appl. No.: 843,183

[22] Filed: Oct. 18, 1977

Related U.S. Application Data

[63] Continuation of Ser. No. 585,727, Jun. 10, 1975, now Defensive Publication No. T945,008.

[51] Int. Cl.² .............................................. G21C 15/00
[52] U.S. Cl. ........................................ 176/65; 417/79
[58] Field of Search .................. 176/65, 50, 61, 38, 176/40, 64; 417/79-83

[56] References Cited

U.S. PATENT DOCUMENTS

| T939,002 | 10/1975 | Patterson et al. | 176/65 |
| 2,095,534 | 10/1937 | Schmidt | 417/80 |
| 2,162,074 | 6/1939 | Everson | 417/79 |
| 2,823,613 | 2/1958 | Leduc | 417/80 |
| 2,921,891 | 1/1960 | Colichman et al. | 176/50 |
| 3,568,781 | 3/1971 | Campbell et al. | 176/65 |
| 3,607,635 | 9/1971 | Ripley et al. | 176/65 |
| 3,951,738 | 4/1976 | George et al. | 176/65 |
| 3,981,770 | 9/1976 | Middleton | 176/65 |

FOREIGN PATENT DOCUMENTS

| 835135 | 2/1970 | Canada | 417/79 |
| 1236674 | 3/1967 | Fed. Rep. of Germany | 176/65 |
| 476440 | 5/1915 | France | 417/79 |
| 1514500 | 1/1968 | France | 176/65 |

*Primary Examiner*—Harvey E. Behrend
*Attorney, Agent, or Firm*—Edward L. Levine; Z. L. Dermer

[57] ABSTRACT

A system for transporting reactor coolant in nuclear reactors using a liquid coolant. The system diverts a portion of the output from the main circulating pump in the nuclear reactor primary flow system and introduces this diverted coolant back into the system upstream of the main circulating pump. This diverted coolant compensates for any pressure drop which may occur due to the pumping action, thereby maintaining a constant head to the circulating pump.

2 Claims, 3 Drawing Figures

FIG. I

NUCLEAR REACTOR COOLANT TRANSPORT SYSTEM

This is a continuation of application Ser. No. 585,727 filed June 10, 1975, now Defensive Publication No. T945,008.

BACKGROUND OF THE INVENTION

This invention relates generally to nuclear reactors and more particularly to a system for transporting reactor coolant in nuclear reactors utilizing a liquid coolant.

One type of nuclear reactor presently in use produces heat by fissioning of nuclear materials which are fabricated into fuel elements and assembled within a nuclear core situated in a pressure vessel. In commercial nuclear reactors of this type, the heat produced thereby is used to generate electricity. Such nuclear reactors typically comprise one or more primary flow and heat transfer systems, and a corresponding number of secondary flow and heat transfer systems to which conventional steam turbines and electrical generators are coupled. A typical energy conversion process for such commercial nuclear reactor, therefore, involves transfer of heat from a nuclear core to a primary coolant flow system, to a secondary system which generates steam which is employed in the production of electricity.

In advanced liquid cooled nuclear reactors, such as a liquid metal cooled breeder reactor, a reactor coolant, such as liquid sodium, is circulated through the primary coolant flow system. A typical primary system comprises a nuclear core within a reactor vessel, a circulating pump, a heat exchanger, and piping interconnecting the aforementioned apparatus. In nuclear reactors having more than one primary system, the nuclear core and the reactor pressure vessel are common to each of the primary systems.

The heat generated by the nuclear core is removed by the reactor coolant which flows into the reactor vessel and through the reactor core. The heated reactor coolant exits from the reactor vessel and flows to the circulating pump. In advanced breeder reactor designs such as this the reactor coolant then flows to the heat exchanger which transfers its heat to an intermediate flow system associated therewith. The cooled reactor coolant exits from the heat exchanger and flows into the pressure vessel, repeating the described flow cycle.

In addition to the reactor coolant found in the pressure vessel of liquid metal breeder reactors, the circulating pump generally has a reservoir of coolant above it in the pump enclosure. When there is no pump flow, the level of reactor coolant in the pressure vessel and the level of coolant in the pump reservoir are equal. When the pump is operating, however, a pressure differential occurs in the pipe between the outlet of the pressure vessel and the inlet of the pump. To maintain a constant pump flow, coolant from the pump reservoir must be utilized. The amount of pump reservoir coolant required is equivalent to the pressure differential in the pump suction pipe.

Because the pump impeller must always remain submerged, the amount of coolant in the pump reservoir must be adequate to compensate for any pressure differentials which may occur. A problem arises in that, if the pressure differential is great, the amount of reactor coolant in the pump reservoir becomes quite large. As the pump motor is external to the reservoir, the problem occurs in the length of shaft required between the propeller and the motor. There is a maximum length above which the length of shaft is not functional. This length limits the amount of reactor coolant which can be stored in the pump reservoir. This problem may be effectively solved by minimizing the amount of pressure differential in the pump suction pipe.

One means of minimizing this pressure differential would be to pressurize the cover gas found in the reactor pressure vessel of such advanced reactors above the reactor coolant level. This solution may pose a safety problem under certain conditions. In the unlikely event of a pipe rupture accident, the cover gas pressure would accelerate the discharge of the reactor coolant from the system. The rapid discharge of coolant is most undesirable under these conditions.

Another means to prevent excessive pressure differentials, and corresponding pump reservoir level drops, is to make the pump suction pipe quite large (e.g., 36 inches or more). This large pipe facilitates the flow of coolant to the inlet of the circulating pump. This method has its disadvantages. The large pipe size affects the size required for the containment buildings, the size of the primary system storage tanks, and requires the development of a large isolation valve for such large pipe. Additionally, because of the limited available pump suction head, the pump speed is limited to prevent cavitation. This requirement for low pump speed also affects the containment building size because low speed pumps are larger than high speed pumps.

The optimum solution to the problem of eliminating the pressure differentials found in the pump suction pipe is one which does not cause any safety problems, and which permits reduction in size, and the associated costs, of the primary containment building.

SUMMARY OF THE INVENTION

Briefly stated, this invention eliminates pressure differentials found in the pump suction pipe by incorporating a portion of the output of the circulating pump into the pump suction pipe upstream of the pump. The portion extracted from the output of the circulating pump substantially eliminates the pressure differentials by providing an additional pressure head to the pump inlet. The additional pressure head permits the operation of the pump at a higher speed, and reduces the size requirement of the pump suction pipe. The size requirements of the primary containment building are correspondingly reduced.

BRIEF DESCRIPTION OF THE DRAWINGS

For a better understanding of the invention, reference may be had to the preferred embodiment, taken in connection with the accompanying drawings, in which.

DESCRIPTION OF THE PREFERRED EMBODIMENT

Figure 1:
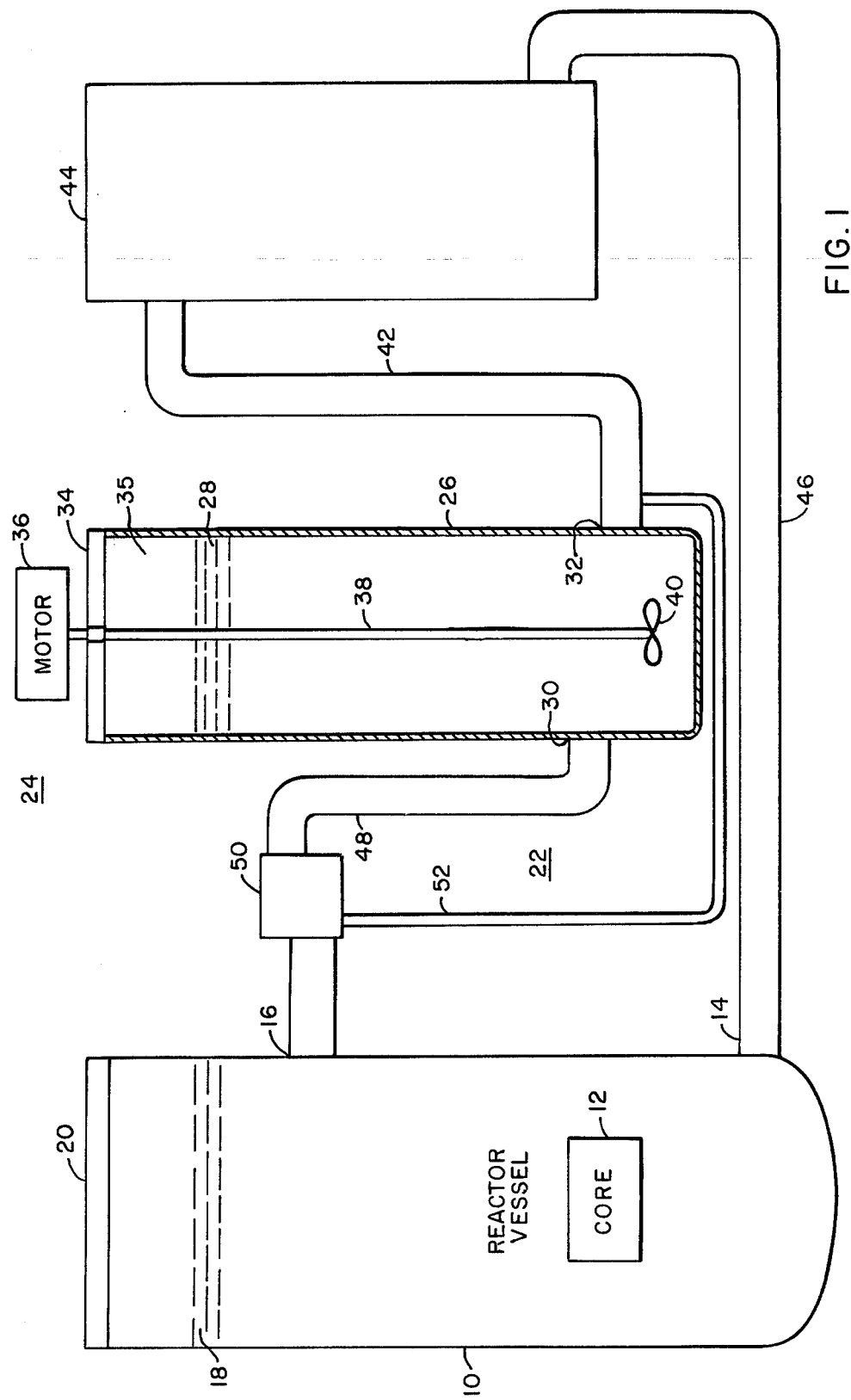
FIG. 1 is a schematic of a primary coolant flow system of a liquid cooled nuclear reactor.

Throughout the description which follows, like reference characters indicate like elements of various figures of the drawings.

FIG. 1 of the drawings illustrates schematically a typical nuclear reactor system which may employ the principles of this invention. A cylindrical enclosure, known generally as a nuclear reactor pressure vessel 10, houses a reactor core 12. The core 12 is comprised mainly of a plurality of clad nuclear fuel elements (not shown) containing fissile fuel material such as $U^{235}$ which generate substantial amounts of heat. The reactor pressure vessel 10 has coolant flow inlet means 14 and coolant flow outlet means 16 formed integral with and through its cylindrical walls. During reactor operation, the reactor pressure vessel 10 is filled with a quantity of reactor coolant, such as liquid sodium, to the level schematically illustrated and designated by the numeral 18. A pressure vessel closure head 20 is utilized to seal the reactor pressure vessel 10.

The heat generated by the reactor core 12 is conveyed from the core 12 by coolant flow entering through inlet means 14 and exiting through outlet means 16. The hot reactor coolant flow exiting through outlet means 16 is conveyed through a portion of interconnecting means 22 to the main pump 24.

The main pump 24 is comprised of an enclosure 26, known generally as a pump reservoir, which is partially filled with reactor coolant to the level designated by the numeral 28. Above the reactor coolant 28 is installed an inert gas 35 known generally as cover gas. The pump 24 has coolant flow inlet means 30 and coolant flow outlet means 32 formed through the pump reservoir 26. The pump reservoir 26 is sealed at its upper end by a plug 34. The pump 24 is driven by a motor 36 which is located externally of the pump reservoir 26. A shaft 38 extends from the pump motor 36 through the plug 34, through the cover gas 35, through the reactor coolant 28 and to the impeller 40 in a manner to translate the mechanical drive of the motor to rotary motion of the impeller. The shaft 38 is sealingly received by the plug 34 to maintain a hermetic enclosure within the pump reservoir.

Coolant, under the forces established by the motion of the impeller, exits from the pump 24 through the pump coolant flow outlet means 32, through interconnecting piping 42 to a heat exchanger 44. The hot reactor coolant transfers the heat it previously acquired from the nuclear core 12 to a fluid of an intermediate heat exchange system (not shown) in heat exchanger 44. Cooled reactor coolant exits from the heat exchanger 44 and flows through interconnecting means 46 to the coolant flow inlet means 14 of the reactor pressure vessel 10.

Although FIG. 1 only shows one primary coolant flow loop of a nuclear reactor, it will be appreciated by those skilled in the art that the invention is not to be limited thereby. The invention may be equally applied to a reactor having any number of primary coolant flow loops. Additionally, the invention may be practiced with a cold leg pump 24, that is, with the pump 24 located such that it pumps reactor coolant after the coolant has exited from the heat exchanger 44.

The interconnecting means 22 between the coolant flow outlet means 16 of the reactor pressure vessel 10 and the coolant flow inlet means 30 of the pump 24 generally includes a pump suction pipe 48. During operation, the pump 24 causes a pressure differential to occur in the pump suction pipe 48 between the inlet means 30 of the pump 24 and the outlet means 16 of the reactor vessel 10. To eliminate this pressure differential, pressure regulating means 50 are installed in the pump suction pipe 48 as close as is practicable to the outlet means 16 of the pressure vessel 10. The pressure regulating means 50, in addition to being connected to the outlet means 16 of the pressure vessel 10, are also connected through bypass conduit means 52 to the outlet means 32 of the pump 24. The bypass conduit means 52 convey a predetermined portion of coolant flow exiting from the outlet means 32 of the pump 24 to the pressure regulating means 50.

The pressure regulating means 50, which may comprise one or more nozzles 70 (FIG. 3) which allow coolant from the bypass conduit means 52 to enter the pump suction pipe 48 or which may be a conventional jet pump, (FIG. 2) substantially eliminate any pressure differential occurring in the pump suction pipe 48. The operation of the pressure regulating means 50 is the same regardless of whether nozzles 70 or the jet pump are used. The nozzles 70 inserted into the pump suction pipe 48 function as a jet pump, but are of an unorthodox configuration, and although the following description utilizes a jet pump, the invention is equally applicable to the nozzle configuration, as will be hereinafter explained.

By substantially eliminating the pressure differential, the amount of reactor coolant 28 in the pump enclosure 26 which is necessary to keep the impeller 40 of the pump 24 submerged is lessened. The reduced amount of required coolant in turn permits a reduction in the size of the pump reservoir 26 necessary to hold it. As the pump reservoir 26 size decreases, the length of shaft 38 necessary to connect the pump motor 36 to the impeller 40 may be correspondingly reduced which can in certain instances also reduce the size of the motor required to drive the impeller.

Figure 2:
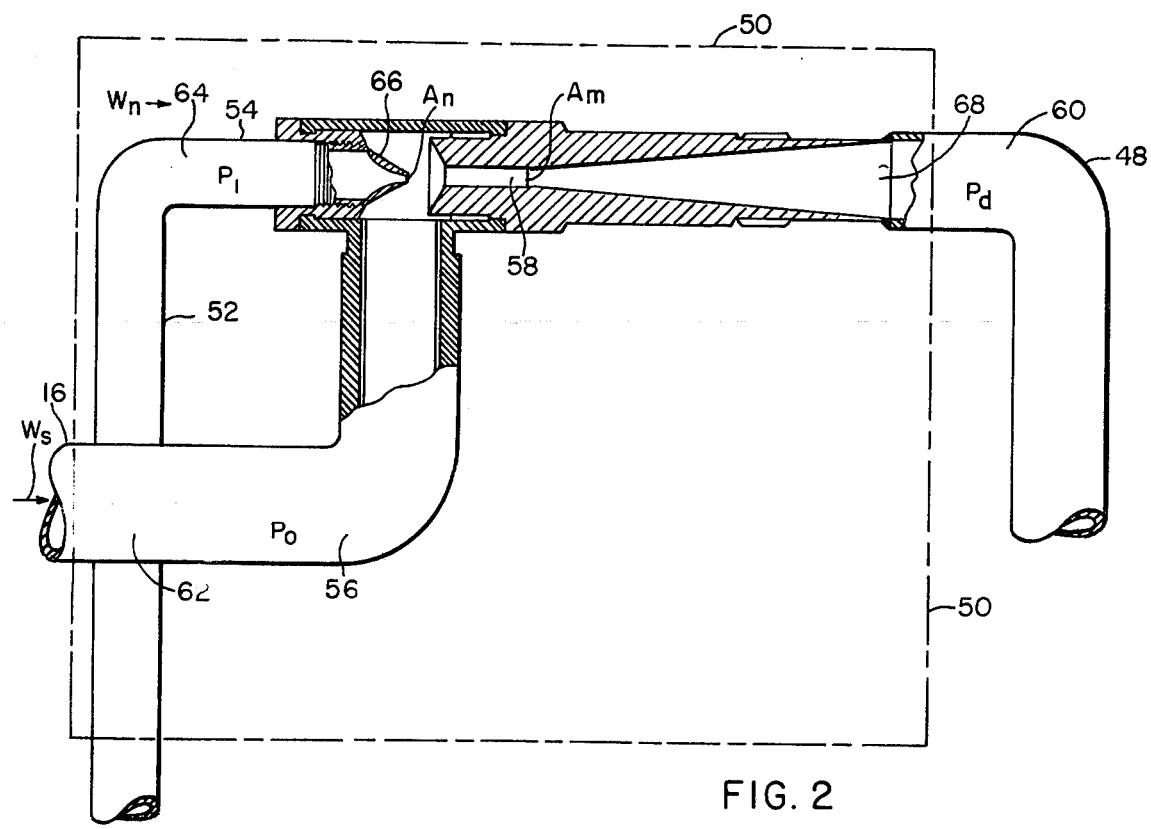
FIG. 2 is an enlarged view of a conventional jet pump which may be used in the primary coolant flow system.

FIG. 2 illustrates a conventional jet pump which may be utilized as the pressure regulating means 50. Though the jet pump is illustrated as exemplary of another embodiment of this invention which provides particular benefit in the arrangement illustrated, one skilled in the art could readily visualize numerous configurations by which the coolant flowing in the bypass conduit means 52 could be placed in fluid communication with the coolant in the pump suction pipe 48. The jet pump 50 illustrated, has two coolant flow inlets, 54 and 56. The nozzle flow inlet 54 conveys that portion of the reactor coolant which has been extracted from the outlet means 32 of the pump 24, and flows through bypass conduit means 52, to the jet pump 50. The main coolant inlet 56 conveys that portion of the reactor coolant coming from the outlet means 16 of the pressure vessel 10 to the jet pump 50. The coolant in the nozzle flow inlet 54 powers the jet pump 50, and hereinafter will be called the powering flow, $W_n$. The coolant in the main coolant inlet 56 will be designated the main coolant flow, $W_s$.

The jet pump 50 has a jet nozzle 66 connected to the nozzle flow inlet 54. This nozzle 66 has a cross-sectional area at its end, $A_n$. The jet pump 50 also has a throat area 58 with a cross-sectional area, $A_m$. The ratio of the area of the jet nozzle, $A_n$, to the area of the throat, $A_m$, is designated the area ratio, b. The powering coolant flow, $W_n$, enters through the nozzle 66, mixes with the main coolant flow, $W_s$, in the throat section 58, passes through the diffuser section 68, and flows into the pump suction pipe 48.

Along with these flows, there are three pressures associated with the jet pump 50. The pressure of the coolant flow at the end 60 of the diffuser 68 is the diffuser pressure $P_d$. The pressure of the powering coolant flow at the nozzle 66 is the nozzle pressure, $P_i$, and is indicated as the point 64. The main coolant flow pressure, $P_o$, is the pressure of the main coolant flow at the point 62 in the main coolant inlet 56. The difference in pressure between the points 60 and 62, $P_d-P_o$, is the pressure differential needed to make up for the pressure losses in the pump suction pipe 48. The pressure differential between the points 64 and 60, $P_i-P_d$, is the loss in pressure of the powering coolant flow. The pressure ratio, N, is the ratio of the pressure gained divided by the pressure lost, or $(P_d-P_o)/(P_i-P_d)$.

The amount of reactor coolant which should be extracted from the flow exiting the outlet means 32 of the pump 24 varies with the pressure ratio, N, and the design of the jet pump 50. As is well known in the art, each pressure ratio, N, can have a multitude of flow ratios, $\phi$, which is defined as the ratio of the main coolant flow $W_s$ to the powering flow $W_n$, depending upon the design of the jet pump 50, most notably varying with the area ratio, b. Publications such as "Jet Pump Theory and Performance With Fluids Of High Viscosity" by R. G. Cunningham, in the November, 1957 issue of *Transactions Of The ASME*, Vol. 79, pt. 2, give the exact relationship between the pressure ratio N and the flow ratio $\phi$ for different values of the area ratio b. Using this theory, once the pressure differential necessary to overcome losses in the pump suction pipe 48 are calculated, the pressure ratio and the flow ratios can be determined, and the percentage of reactor coolant to be extracted from the outlet flow exiting through outlet means 32 of the pump 24 is the reciprocal of the flow ratio, $\phi$.

Alternatively, if the efficiency, $\eta$, of the jet pump 50 is known, the flow ratio $\phi$ can be calculated using the equation $$\phi = \eta/N.$$

As before, the percentage of reactor coolant to be extracted from the outlet flow exiting through outlet means 32 of the pump 24 is the reciprocal of the flow ratio $\phi$.

Figure 3:
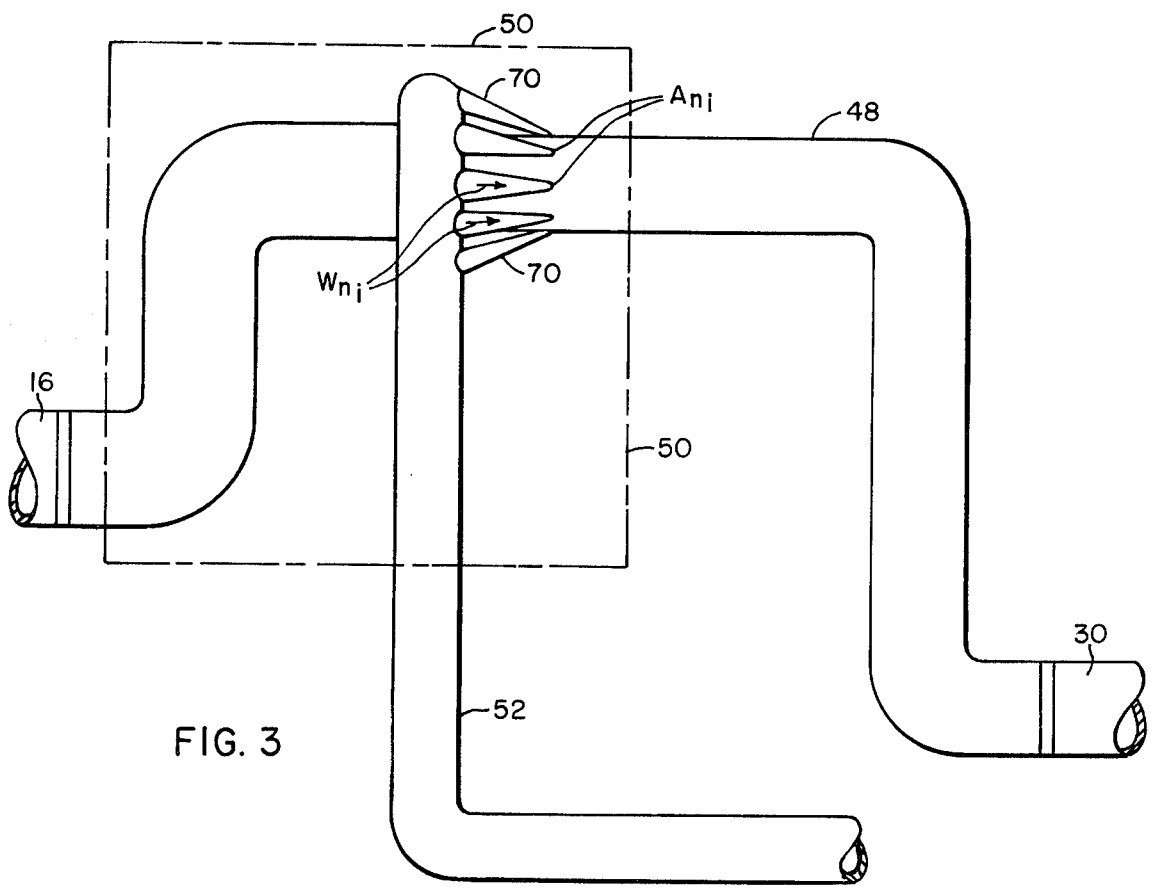
FIG. 3 is a modification of the device shown in FIG. 2.

If the pressure regulating means 50 utilized are the nozzles 70 as shown in FIG. 3, the flow ratio is determined as above but with the powering flow, $W_n$ being the sum total of the power flows $W_{ni}$ in each nozzle 70. The net nozzle area, $A_n$, would be the sum total of the individual areas, $A_{ni}$, for each nozzle 70. The transfer of momentum from the powering flow $W_n$ to the main coolant flow, $W_s$, will then occur from adjacent to the pipe 48 wall to the contour of the pipe 48, as opposed to the normal jet pump transfer which begins at the contour of the pipe and spreads outwardly to the pipe wall. One additional benefit which this configuration provides is that if one of the nozzles 70 becomes inoperative redundancy is provided by the remaining nozzles 70 to continue the pressure regulating function.

When the reactor system is not operating, the level of coolant 18 in the pressure vessel 10 is the same as the level of coolant 28 in the pump enclosure 26, and there is no reactor coolant flow in the bypass conduit means 52. As reactor operations begin, the motor 36 increases speed, driving the impeller 40 through the shaft 38. Because there is no reactor coolant flow in the bypass conduit 52, the jet pump 50 is not powered, and the only coolant flow from the outlet means 16 of the pressure vessel 10 to the inlet means 30 of the pump 24 is that which is caused by the pump 24. Because the jet pump 50 does not increase the pressure in the pump suction pipe 48, a pressure differential occurs between the reactor outlet 16 and the pump inlet 30 which causes the suction in the pipe 48. Thus, additional reactor coolant must be used from the pump reservoir 26 to maintain a constant flow through the outlet means 32 of the pump 24. As the pump motor 36 increases speed, coolant is extracted from the outlet means 32 of the pump 24 and flows through bypass conduit means 52 to the jet pump 50. The bypass flow is established by the suction in pipe 48. This powering coolant flow, $W_n$, mixes with the main coolant flow, $W_s$, in the jet pump 50 and produces a head. This head is substantially equal to the pressure differential caused in the suction pipe 48 by the action of the pump 24. This head developed is proportional to the amount of coolant flow, $W_n$, in the nozzle 66.

Once operations have begun, the fluid transport system is self-compensating. If it is desired to increase the speed of the pump 24, the increased speed will cause a pressure differential to occur in the pump suction pipe 48; but this increase in speed of the pump 24 will also increase the amount of coolant flow exiting through the outlet means 32 of the pump 24. However, the amount of coolant extracted from the outlet means 32 is a predetermined constant percentage of the total exiting flow, therefore the flow in the bypass conduit means 52 is also increased. The increase in coolant flow in the bypass conduit 52 causes an increase in the amount of coolant flowing through the nozzle 66. Because this nozzle flow, $W_n$, is increased, the mixing process with the main coolant flow, $W_s$, produces an increased head. This increased head is equivalent to the increased pressure differential in the pump suction pipe 48. It can be seen, therefore, that this system eliminates any pressure differentials in the pump suction pipe 48 and permits the reduction in size of the main pump 24.

I claim as my invention:

1. An arrangement for transporting reactor coolant fluid in a nuclear reactor system comprising:

a sealed reactor vessel;

a primary variable speed pump having an inlet and outlet and being of a type having a motor disposed above a coolant reservoir and an elongated shaft connecting said motor to an impeller, said impeller receiving coolant from said inlet and discharging coolant to said outlet, said impeller also being in fluid communication with said reservoir;

a heat exchanger;

piping for directing coolant between said vessel, pump and heat exchanger in a recirculating loop including upstream piping directly connecting said pump inlet and the one of said vessel and heat exchanger upstream of said pump;

means for controlling the pressure of coolant entering said pump inlet including a bypass conduit directing a portion of said coolant exiting said pump to said upstream piping, said bypass conduit directly connecting said pump outlet to said upstream piping, said bypass conduit discharging said portion into said upstream piping through a plurality of nozzles, said nozzles disposed about the outer periphery of said upstream piping and directed such that said portion is injected into said piping from the outer periphery of said piping into said piping generally in the direction of coolant flowing in said piping.

2. The arrangement according to claim 1, wherein said upstream piping has a pressure drop associated therewith and said injection produces a head being substantially equal to said pressure drop.

\* \* \* \* \*